DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 14, 1971

893 O.G. 403

T893,010

PRODUCTION OF LAMINATES

David Fairclough Oxley, St. Albans, England, assignor to Imperial Chemical Industries Limited, London, England

Filed Feb. 4, 1971, Ser. No. 112,819

**Int. Cl. B29d *27/00;* B29f *1/00***

U.S. Cl. 264—45

No Drawing. 10 Pages Specification

A process for the production of laminates by sequentially injecting two or more synthetic resins into a mould in which a compound to improve the adhesion between the synthetic resins is also injected into the mould. The resins are maintained within the mould for sufficient time for them to set and for a bond to form between them with the aid of the adhesion improving compound. The process is particularly useful for articles having a cellular core and an unfoamed surface. The adhesion improving compound, which may itself be a synthetic resin, may be injected into the mould between the injection of the synthetic resins so that an adhesive layer is formed between them. Also, the adhesion improving compound may comprise two components which react with each other in which case each component is incorporated into adjacent layers of the synthetic resins so that the components react along the line defining the join between the synthetic resins to form a bond.